(12) United States Patent
Samper et al.

(10) Patent No.: US 6,483,223 B2
(45) Date of Patent: Nov. 19, 2002

(54) METHOD TO PREVENT CHARGING EFFECTS IN ELECTROSTATIC DEVICES

(75) Inventors: Victor Donald Samper, Singapore (SG); Uppili Sridhar, Singapore (SG); Olaf Knueppel, Berlin (DE); Feng Han Hua, Singapore (SG); Hui Wing Cheong, Singapore (SG)

(73) Assignee: Institute of Microelectronics, Singapore (SG)

( * ) Notice: Subject to any disclaimer, the term of this patent is extended or adjusted under 35 U.S.C. 154(b) by 0 days.

(21) Appl. No.: 09/795,185

(22) Filed: Mar. 1, 2001

(65) Prior Publication Data

US 2002/0121838 A1 Sep. 5, 2002

(51) Int. Cl.$^7$ ................................ H02N 1/00
(52) U.S. Cl. ................................ 310/309
(58) Field of Search ........................ 310/309

(56) References Cited

U.S. PATENT DOCUMENTS

| | | | | |
|---|---|---|---|---|
| 5,235,225 A | * | 8/1993 | Colgate et al. | 310/12 |
| 5,822,170 A | | 10/1998 | Cabuz et al. | 361/225 |
| 6,140,737 A | * | 10/2000 | Boie | 310/309 |
| 6,191,518 B1 | * | 2/2001 | Suzuki | 310/309 |
| 6,331,257 B1 | * | 12/2001 | Loo et al. | 216/13 |

OTHER PUBLICATIONS

Akihiro Koga et al., "Attachment/Detachment Electrostatic Micro Actuators for Pan–Tilt Drive of a Micro CCD Camera", Proceedings of the IEEE Micro Electro Mechanical Systems Workshop, Feb. 11–15, 1996, pp. 509–513.
Mark N. Horenstein et al., "Electrostatic Effects in Micromachined Actuators for Adaptive Optics", Journal of Electrostatics 42 (1997) 69–81.
K.M. Anderson et al., "A Model of the Attachment/Detachment Cycle of Electrostatic Micro Actuators", DSC vol. 32, Microelectromechanical Sensors, and Systems, ASME 1991, pp. 255–268.
Wibbeler et al., Parasitic Charging of Dielectric Surfaces in Capacitive Microelectromechanical Systems (MEMS), Sensors and Actuators A71 (1998) pp. 74–80.
Saku Egawa et al., "Film Actuators: Planar, Electrostatic Surface–Drive Actuators", (IEEE CH2957–9/91 PP. 9–14).
Saku Egawa et al., "Multi–Layered Electrostatic Film Actuator", (CH2832–4/90 pp. 166–171).
D. Jaume et al., "High–Voltage Planar Devices Using Field Plate and Semi–Resistive Layers", (IEEE Transactions on Electron Devices), vol. 38, No. 7, Jul. 1991, pp. 1681–1684.
R. Held et al., "Investigation of Static and Dynamic Characteristics of SOI–LDMOSFET's Passivated with Semi–insulating Layers", (5th International Symposium on Power Semiconductor devices and ICS, 1993, pp. 130–134.
G. Charitat et al., "1000 and 1500 Volts Planar Devices Using Field Plate and Semi–Resistive Layers: Design and Fabrication", (IEDM 90–803, pp. 32.5.1–32.5.4).

\* cited by examiner

*Primary Examiner*—Mark O. Budd
(74) *Attorney, Agent, or Firm*—George O. Saile; Stephen B. Ackerman

(57) ABSTRACT

The present invention significantly reduces charging effects in electrostatic devices due to charge accumulation in or on the insulating materials on the active surfaces of the devices. This has been achieved by replacing the dielectric material that is normally present between the force generating conductor surfaces with a semi-insulating material. This semi-insulating film overcomes the effects of charging, while avoiding short-circuits when the surfaces are pulled into contact. It is not subject to insulation breakdown within the range of voltages used to operate the device. Examples of semi-insulating materials that may be used are semi-insulating polysilicon (SIPOS) and silicon rich silicon nitride.

25 Claims, 2 Drawing Sheets

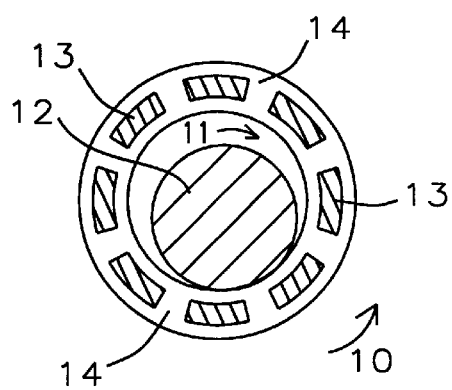
FIG. 1 – Prior Art
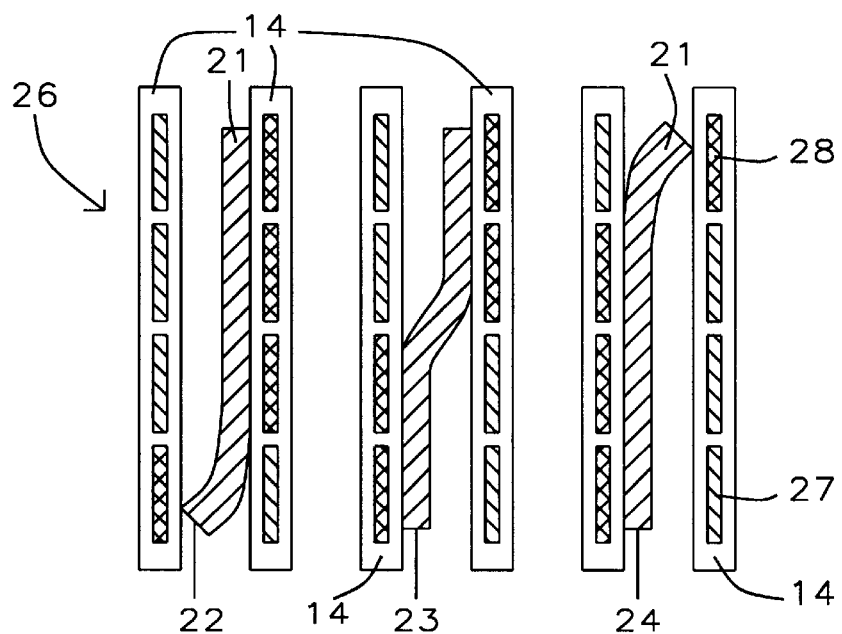
FIG. 2 – Prior Art
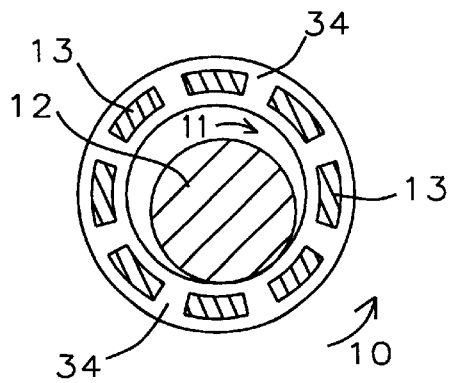
FIG. 3

METHOD TO PREVENT CHARGING EFFECTS IN ELECTROSTATIC DEVICES

FIELD OF THE INVENTION

The invention relates to the general field of electrostatic devices with particular reference to the prevention of charge accumulation during attachment/detachment cycles.

BACKGROUND OF THE INVENTION

Over the past several years, much progress has been made in the development of electrostatic actuators mainly through adoption of the same photolithographic and etching techniques as those employed for fabricating integrated circuits. Micro electromechanical systems (MEMS) devices employ small air gaps (below the Paschen minimum) so can sustain relatively large electric fields without breakdown. The electrostatic forces produced by these large fields are comparable to counteracting mechanical forces present in devices of this size, thereby making electrostatic control of motion and position feasible.

In FIG. 1 we show, in schematic representation, an example of an electrostatic actuator based motor known as a wobble motor. The principal components are a rotor 12. made of an insulating material, and a stator in the form of a tube inside which the rotor 12 rotates. This stator is, essentially, a series of electrodes 13 (the actuators) that are insulated from one another and from the rotor by being encased within dielectric material 14. Voltage is successively applied to succeeding electrodes 13 in a constant direction, such as 10, so that rotor 12 is constantly being attracted to the next actuator in line, resulting in its rotating in direction 11.

FIG. 2 is an example of a linear motor having multiple stators such as 26. Each such stator has the form of a rigid beam made up of (in this example) four actuators such as 27 or 28 encased in a dielectric 14. The rotor 21 in this design is a beam of insulating, as well as flexible, material of a similar size and shape as the stator. Depending on which actuators are charged, the shape of the rotor can be altered. In FIG. 2, uncharged actuators (such as 27) are shown as hatched while charged actuators (such as 28) are shown as solid. Three possible shapes, 22, 23, and 24, for the rotors are shown in this example. By cyclically adjusting the rotor shapes, rotary (via crankshaft) or linear (reciprocating) motion can be achieved.

Structures such as those just discussed, that utilize electrostatic forces to attract members into direct contact with one another, are known to suffer from charging effects whereby charge gradually builds up on the surface of the dielectric 14. This charging behavior manifests itself in two ways: as a variation in the potential required to attract the members into contact and as a time delay in the separation of the members after the applied potential has been removed.

The problem has been classified as the attachment /detachment cycle and has been reported in a number of papers. For example, K. M. Anderson and J. E. Colgate in "A model of the attachment/detachment cycle of electrostatic micro actuators", DSC Vol 32, Microelectromechanical Sensors, Actuators, and Systems, ASME 1991 pp 255–268, have identified several mechanisms which provide valid explanations for the observations. These include ionization in the air gap, tribo charging due to dissimilar materials, and surface micro conduction.

Ionization has been confirmed as a mechanism by Wibbler et al. (wibbeler J, Gunter P, and Hietschold M, "Parasitic charging of dielectric surfaces in Capacitive micro electromechanical systems (MEMS)", Sensors and Actuators A71 (1998) pp 74–80).

Tribo charging is commonly eliminated by ensuring that the materials that are brought into contact with one another have similar work functions.

Surface microconduction can be minimized by reducing the contact area but this solution does not eliminate the problem.

Of interest, also, is work on the charging problem that was done in two fields unrelated to electrostatic microstructure, but using materials to which the present invention could be applied. These are "The design of quasi electrostatic induction actuators" by Egawa S, Niino, T, and Higuchi T, in "Film actuators: planar electrostatic surface-drive actuators", (IEEE CH2957-9/91 pp. 9–14) and Egawa, S and Higuchi, T in "Multi-layered electrostatic film actuator", (CH2832-4/90 pp 166–171). In the latter, low mobility of charge in high resistivity materials is exploited as a mechanism for generating force in a moving electrostatic field.

In the fabrication of high voltage integrated circuits, semi-insulating polysilicon (SIPOS) has been used as a means of passivating electronic structures and limiting the surface charge sensitivity and external electric field sensitivity of devices by providing a resistive field shield. For example, Jaume D, Charitat G, Reynes J M, and Rossel P in "High-voltage planar devices using field plate and semi-resistive layers", (IEEE Transactions on Electron Devices Vol 38 No. 7 July 1991 pp 1681–1684); Held R, Serafin J, Fullmann M, Constapel R, and Korec J, in "Investigation of static and dynamic characteristics of SOI-LDMOSFETs passivated with semi-insulating layers", (5th International Symposium on Power Semiconductor devices and IC's 1993 pp 130–134); and Charitat G, Jaume D, Peyre-Lavigne A, and Rossel P, in "1000 and 1500 volts planar devices using field plate and semi-resistive layers: design and fabrication", (IEDM 90-803 pp. 32.5.1–32.5.4.

A routine search of the patented prior art was conducted but no references that teach the same solution to the charging problem as that disclosed in the present invention were uncovered. Of interest is a description by Cabuz et al. in U.S. Pat. 5,822,170 of a hydrophobic coating for reducing humidity effects in electrostatic actuators This addresses the effects of charging due to moisture related effects by a hydrophobic surface treatment.

SUMMARY OF THE INVENTION

It has been an object of the present invention to provide an electrostatically actuated device which is not subject to charging effects that either slow down the operation of the device, gradually increase the voltage required to operate the device, or cause parts of the device to adhere to each other at the wrong time.

Another object of the invention has been to provide a method for forming said electrostatic device.

A further object has been that said method not change significantly the operating characteristics of the device.

These objects have been achieved by replacing the dielectric material that is normally present between the force generating conductor surfaces with a semi-insulating material. This semi-insulating film overcomes the effects of charging, while avoiding short-circuits when the surfaces are pulled into contact. It is not subject to insulation breakdown within the range of voltages used to operate the device.

BRIEF DESCRIPTION OF THE DRAWINGS

FIGS. 1 and 2 show the basic elements of two types of electrostatic motors of the prior art.

FIGS. 3 and 4 illustrate the motors seen in FIGS. 1 and 2, respectively, after they have been modified according to the teachings of the prior art.

DESCRIPTION OF THE PREFERRED EMBODIMENTS

Figure 4:
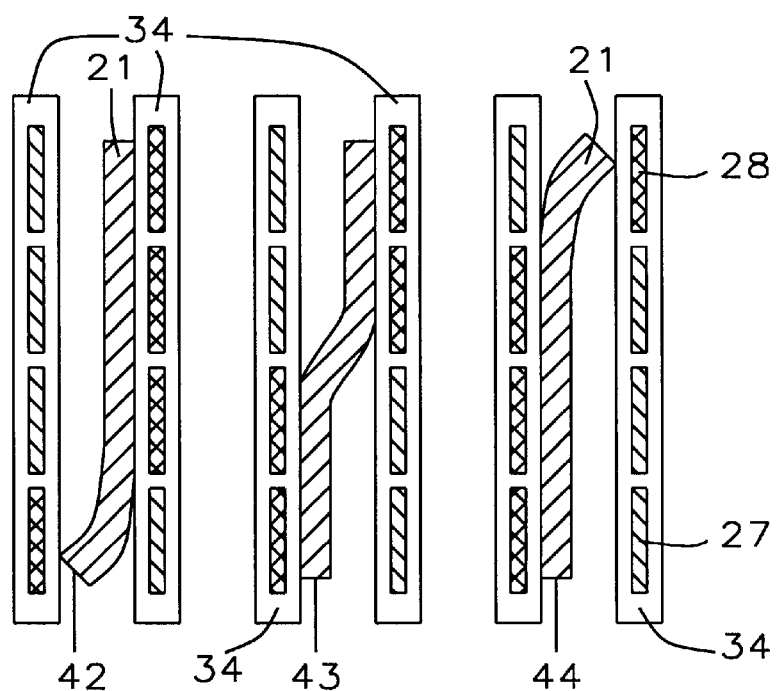

The invention pertains to MEMS actuators, in which 2 capacitive surfaces are charged with voltage so there is a difference in voltage between the surfaces. In the past, a high quality dielectric has been used to separate the 2 surfaces, to minimize leakage between the surfaces. However, when a high quality dielectric such as a thermal oxide is used, charge builds up on the dielectric surface and the surface itself becomes charged.

The dielectric surface charging is a long standing problem in the art, and many attempts have been made to correct it.

The invention is to use a dielectric material that has a lower quality, that leaks current, in the nanoamp or microamp range. The amount of leakage needs to be tuned for a given application—a higher leakage may be used where a faster discharge time is needed, but it limited by the amount of power that can be allowed to be consumed. A lower leakage would limit power consumption but require more time for charge dissipation.

In electrostatic charging, any additional charges or uneven charge distribution introduced in the material generates an electric field. Charges within the material subsequently experience an electrostatic force due to this electric field and redistribute over time, thus reducing the electric field and restoring equilibrium. For an imbalance introduced into a system, the time constant of decay is determined by the material's dielectric constant and resistivity. The time constant T known as the dielectric relaxation constant, is:

$$\tau = \rho \in$$

where $\rho$ is the resistivity and $\in$ is the dielectric constant.

The magnitude of the density of space-charge centers as a function of time has been given by Warner and Grung (Transistors—Fundamentals for the Integrated Circuit Engineer, John Wiley & Sons 1983) as $$p - p_0 = [p(0) - p_0] \exp(-t/\tau)$$

where p is the space-charge.

Thus, for materials with very low resistivity such as gold, $\tau$ can be $<10^{18}$ seconds and charging is no longer an issue. Materials such as silicon dioxide with resistivity in the range of $10^{15}$ ohm-cm can have time constants of the order of seconds. These materials do suffer from effects associated with charging.

It has been postulated that surface charge can be transferred from a conductor to an insulator in a mechanical contact system due to enhanced electric fields at non-ideal asperity tips. However, the accumulated charge on the surface of the insulator has poor mobility so its dissipation is slow enough to interfere with the performance of the device.

Given that transfer of charge cannot be fully suppressed, the solution offered by the present invention is to adjust the dielectric relaxation constant of the insulating material by an amount that is just sufficient to allow accumulated charge to bleed off at a rate that is fast enough to enable the device to operate satisfactorily without requiring excessive power to maintain the applied operating voltages on the actuators. It is also important that the dielectric breakdown characteristics of the semi-insulating material not be compromised.

In practice, time constants in the range $10^{-4}$–$10^{-5}$ seconds are acceptable. This results in a maximum power consumption of about $10^{-6}$ Watt/Volt.

Thus, taken in its widest view, the present invention teaches that, given two bodies (that are electrically isolated one from another) that are to form an electrostatic device, the attachment/detachment problem can be overcome by depositing on the surface of at least one of these bodies a layer of a semi-insulating material. The requirements for this material are that it should have a resistivity and a dielectric constant appropriate to the power consumption and a dielectric relaxation constant acceptable for the device and application. If these specifications are met it will be possible to alternately charge and discharge these bodies at least ten times a second so that they alternately do and don't attract one another without unwanted effects of charge building up on either of the bodies.

More specifically, the semi-insulating layer should have a thickness between about 1,000 and 15,000 Angstroms, a resistivity between about $9 \times 10^7$ and $9 \times 10^{10}$ ohm-cm, a dielectric constant between about 8 and 12, and a dielectric relaxation constant that is between about $0.1 \times 10^{-3}$ and $100 \times 10^{-3}$ seconds.

An additional requirement for the layer of semi-insulating material is that it has a breakdown voltage greater than the maximum specified actuation voltage for the device. In general this implies a breakdown voltage between about 10 and 200 volts.

Viewed somewhat more narrowly, the present invention may be applied to an electrostatic device comprising a pull-in structure and a fixed structure that are electrically isolated one from another. As in the general case, a layer of a semi-insulating material is to be deposited over one of the structures. Two semi-insulating materials that meet the specifications outlined above are semi-insulating polysilicon (SIPOS) and silicon rich silicon nitride. Other candidate materials include amorphous silicon, cermets, and carbon based films.

SIPOS is best deposited by Low Pressure Chemical Vapor Deposition (LPCVD) while the silicon rich silicon nitride was deposited by Plasma Enhanced Chemical Vapor Deposition (PECVD).

Comparisons were made between samples with and without semi-insulating films, thermal silicon oxide being compared to silicon rich silicon nitride films as the insulating layer between conductors in an electrostatically deflected cantilever structure. Significant improvement was seen. Thermal oxide showed significant charging over 60 seconds; no further tests for longer durations could be performed. In the case of the silicon rich silicon nitride, tests were performed over more than 2 hours without observing a change as significant as that seen with thermal oxide during the first 60 seconds. The small amount of charging exhibited by the silicon rich samples has been attributed to the charging of surrounding areas, outside the silicon rich nitride layer.

While the invention has been particularly shown and described with reference to the preferred embodiments thereof, it will be understood by those skilled in the art that various changes in form and details may be made without departing from the spirit and scope of the invention.

What is claimed is:

1. A method to prevent charging effects in an electrostatic device, comprising the steps of:

providing first and second conductive parts; and providing a semi-insulating layer, having a resistivity between about $9 \times 10^7$ and $9 \times 10^{10}$ ohm-cm, between said first and second conductive parts, whereby said semi-insulating layer prevents charge build-up during operation of said electrostatic device.

2. The method of claim 1 wherein the first conductive part is a rotor and the second conductive part is a stator.

3. The method of claim 1 wherein said electrostatic device is a MEMS actuator.

4. The method of claim 1 wherein said semi-insulating layer is SIPOS.

5. The method of claim 1 wherein said semi-insulating layer is silicon-rich silicon nitride.

6. The method of claim 1 wherein said semi-insulating layer is deposited to a thickness between about 1,000 and 15,000 Angstroms.

7. The method of claim 1 wherein said semi-insulating layer has a breakdown voltage between about 10 and 200 volts.

8. The method of claim 1 wherein one or more of the conductive parts alternately charges and discharges at least 10 times a second.

9. The method of claim 1 wherein said semi-insulating material layer has a dielectric constant between about 8 and 12.

10. The method of claim 1 wherein said semi-insulating material layer has a dielectric relaxation constant that is between about $0.1 \times 10^{-3}$ and $100 \times 10^{-3}$ seconds.

11. The method of claim 2 wherein said rotor is a cantilever beam.

12. The method of claim 1 wherein said semi-insulating layer is selected from the group consisting of amorphous silicon, cermets, and carbon based films.

13. An electrostatic device that is free of charging effects, comprising:

first and second conductive parts; and a semi-insulating layer, having a resistivity between about $9 \times 10^7$ and $9 \times 10^{10}$ ohm-cm, between said first and second conductive parts, whereby said semi-insulating layer prevents charge build-up during operation of said electrostatic device.

14. The electrostatic device described in claim 13, wherein said semi-insulating layer is SIPOS or silicon-rich silicon nitride.

15. The electrostatic device described in claim 13, wherein said semi-insulating layer has a thickness between about 1,000 and 15,000 Angstroms.

16. The electrostatic device described in claim 13, wherein said semi-insulating layer has a breakdown voltage between about 10 and 200 volts.

17. The electrostatic device described in claim 13 wherein said semi-insulating layer has a dielectric constant between about 8 and 12 and a dielectric relaxation constant that is between about $0.1 \times 10^{-3}$ and $100 \times 10^{-3}$ seconds.

18. The electrostatic device described in claim 13 wherein said semi-insulating layer is selected from the group consisting of amorphous silicon, cermets, and carbon based films.

19. An electrostatic apparatus that is free of charging effects, comprising:

a rotor;

a stator; and a semi-insulating layer, having a resistivity between about $9 \times 10^7$ and $9 \times 10^{10}$ ohm-cm, between said rotor and stator, whereby said semi-insulating layer prevents charge build-up during operation of said electrostatic apparatus.

20. The electrostatic apparatus described in claim 19 wherein said rotor is a cantilever beam.

21. The electrostatic apparatus described in claim 19 wherein said semi-insulating layer is SIPOS or silicon-rich silicon nitride.

22. The electrostatic apparatus described in claim 19 wherein said semi-insulating layer has a thickness between about 1,000 and 15,000 Angstroms.

23. The electrostatic apparatus described in claim 19 wherein said semi-insulating layer has a breakdown voltage between about 10 and 200 volts.

24. The electrostatic apparatus described in claim 19 wherein said semi-insulating layer has a dielectric constant between about 8 and 12, and a dielectric relaxation constant that is between about $0.1 \times 10^{-3}$ and $100 \times 10^{-3}$ seconds.

25. The electrostatic device described in claim 19 wherein said semi-insulating layer is selected from the group consisting of amorphous silicon, cermets, and carbon based films.

* * * * *

UNITED STATES PATENT AND TRADEMARK OFFICE
CERTIFICATE OF CORRECTION

PATENT NO. : 6,483,223 B2
DATED : November 19, 2002
INVENTOR(S) : Victor Donald Samper et al.

It is certified that error appears in the above-identified patent and that said Letters Patent is hereby corrected as shown below:

<u>Title page,</u>
Item [75], please delete "Hui Wing Cheong" and replace with -- Wing Cheong Hui --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,483,223 B2
DATED : November 19, 2002
INVENTOR(S) : Victor Donald Samper et al.

It is certified that error appears in the above-identified patent and that said Letters Patent is hereby corrected as shown below:

<u>Title page,</u>
Item [75], please delete "Hui Wing Cheong" and replace with -- Wing Cheong Hui --.

Item [73], please add -- Tyco Electronics EC GmbH & Co KG, Berlin, Germany -- as the second assignee.

Signed and Sealed this

First Day of July, 2003

JAMES E. ROGAN
*Director of the United States Patent and Trademark Office*